United States Patent [19]

Maier

[11] Patent Number: 4,765,660
[45] Date of Patent: Aug. 23, 1988

[54] ELASTIC PIPE CONNECTOR

[75] Inventor: Hans P. Maier, Zürich, Switzerland

[73] Assignee: Agintec AG, Zürich, Switzerland

[21] Appl. No.: 103,269

[22] Filed: Oct. 1, 1987

Related U.S. Application Data

[62] Division of Ser. No. 901,181, Aug. 27, 1986, Pat. No. 4,717,181.

[30] Foreign Application Priority Data

Aug. 30, 1985 [DE] Fed. Rep. of Germany ....... 3530972

[51] Int. Cl.[4] .............................................. F16L 51/02
[52] U.S. Cl. ..................................... 285/229; 285/415
[58] Field of Search ............... 285/229, 226, 227, 228, 285/299, 415

[56] References Cited

U.S. PATENT DOCUMENTS

| | | | |
|---|---|---|---|
| 1,489,065 | 4/1924 | Clifton | 285/226 X |
| 2,793,883 | 5/1957 | Main, Jr. | 285/229 |
| 2,929,645 | 3/1960 | Meckenstock | 285/415 X |
| 3,164,401 | 1/1965 | Fawkes | 285/229 |
| 3,359,014 | 12/1967 | Clements | 285/229 X |
| 4,186,949 | 2/1980 | Bartha et al. | 285/229 X |
| 4,293,152 | 10/1981 | Berghofer | 285/229 |

FOREIGN PATENT DOCUMENTS 2092992  1/1972  France .................................. 285/229

Primary Examiner—Thomas F. Callaghan
Attorney, Agent, or Firm—Foley & Lardner, Schwartz, Jeffery, Schwaab, Mack, Blumenthal & Evans

[57] ABSTRACT

An elastic connection which functions as a compensator between two pipe ends or the like arranged at a distance from one another, consisting of a bellows body which is arranged between two counter-flanges which, on their respective end face facing the pipe end, are gripped from behind by in each case a rubber-elastic torus of the bellows body, each torus being received in an annular groove. Each counter-flange is connected to a respective flange on each pipe end. In order to make the compensator less expensive and simpler to assemble, the annular groove is formed as an annular sealing chamber which opens conically in the direction of the respective counter-flange. The annular groove, on its radially inwardly located side, is partly defined by the circumference of the respective pipe end and, when the compensator is assembled, acts upon the torus in the radial and axial directions in such a way that the latter fills the sealing chamber and bears under pressure simultaneously on the conical annular surface of the sealing chamber, the end face of the counter-flange and the circumference of the respective pipe end.

5 Claims, 6 Drawing Sheets

ELASTIC PIPE CONNECTOR

This is a division of application Ser. No. 901,181, filed Aug. 27, 1986, now U.S. Pat. No. 4,717,181.

BACKGROUND OF THE INVENTION

The invention relates to a compensator as an elastic connection between two pipe ends or the like arranged at a distance from one another, consisting of a bellows body which is arranged between two counter-flanges which, on their end face facing the pipe end, allocated to them in each case, are gripped from behind by in each case one rubber-elastic torus of the bellows body, which torus plunges into an annular groove, and are connected to one flange each which sits on the allocated pipe end.

Compensators of this type, the bellows bodies of which are made of rubber and can have a fabric reinforcement, are suitable for absorbing thermal expansion, assembly inaccuracies, vibrations and settling movements and for insulation against structure-borne sound in potable water and industrial water lines, especially in sanitary installations, sewage-treatment plants, air-conditioning plants, in the food industry, etc. In these cases, the above-mentioned compensator consists of two flanges which are provided in each case with the said annular groove into which the torus of the bellows body engages. The flanges must then be bolted to flanges to be provided on the pipe ends.

Compensators of this type therefore require flanges welded to the pipe ends or firmly connected to the pipe ends in some other manner and are therefore expensive to manufacture and assemble.

SUMMARY OF THE INVENTION

It is accordingly an object of the invention to form the compensator described hereinabove in such a way that it is less expensive and to simplify it in its assembly.

This object is achieved by a compensator which forms an elastic connection between the ends of two pipes separated by a gap, comprising a bellows body connecting the pipes across the gap, a flange positioned on each pipe adjacent a respective pipe end, a respective counter-flange positioned over the bellows body adjacent each pipe end and having an end face facing a respective flange, means for forming an annular sealing chamber between the flange and counter-flange on each pipe, each sealing chamber having a first conical annular surface opening in the direction of the end face of the counter-flange, a torus formed at each respective end of the bellows body adjacent the ends of the pipes, a respective torus being received in each sealing chamber and fitted over an outer circumference of the respective pipe, and means for applying a compression load to the tori, such that each torus fills a respective annular sealing chamber and bears against the conical annular surface, the end face of the counterflange and the outer circumference of a respective pipe, thereby fluidly sealing the compensator against the pipes and providing sealed fluid communication between the pipes.

DETAILED DESCRIPTION OF THE PREFERRED EMBODIMENTS

The compensator according to the invention can be assembled on smooth pipe ends which have simply been deburred, with suitable wrenches for the bolted joints being required as the sole assembly aid. The new compensator can not only be assembled easily but can be dismantled just as easily. Since during assembly the individual parts only need to be pushed on and clamped against one another via bolted connections, all protective measures specified in an explosion-proof environment can be dispensed with.

Each clamping element can consist of at least one convexly made annular disk. In its annular part, it can have a curved profile and be provided with radial slots. The radially inwardly located clamping edge can be scarfed so as to thus form, when the compensator is clamped on, a light positive connection between the clamping element and the pipe circumference in addition to the frictional connection.

The configuration of the torus, in conjunction with the inner contour of the clamping chamber, leads to a very simple seal which nevertheless can be highly loaded to an exceptional extent. A slight misalignment, during assembly, of the pipe end to the pipe ends to be connected to one another is unimportant.

It can be advantageous if the chamber part and/or the flange consists of several separate annular segments, in particular in the case of large diameters of the pipe ends to be connected to one another.

The chamber part can also be firmly connected to the bellows-body torus allocated to it, for example, by vulcanization. However, it is also possible for fabric reinforcement provided in the bellows body to grip around the chamber part. During manufacture of the bellows body, this reinforcement can first be placed into the injection mold, whereupon the chamber parts are then placed into the mold. Once the injection molding operation is complete, a virtually indissoluble connection is obtained.

Figure 1:
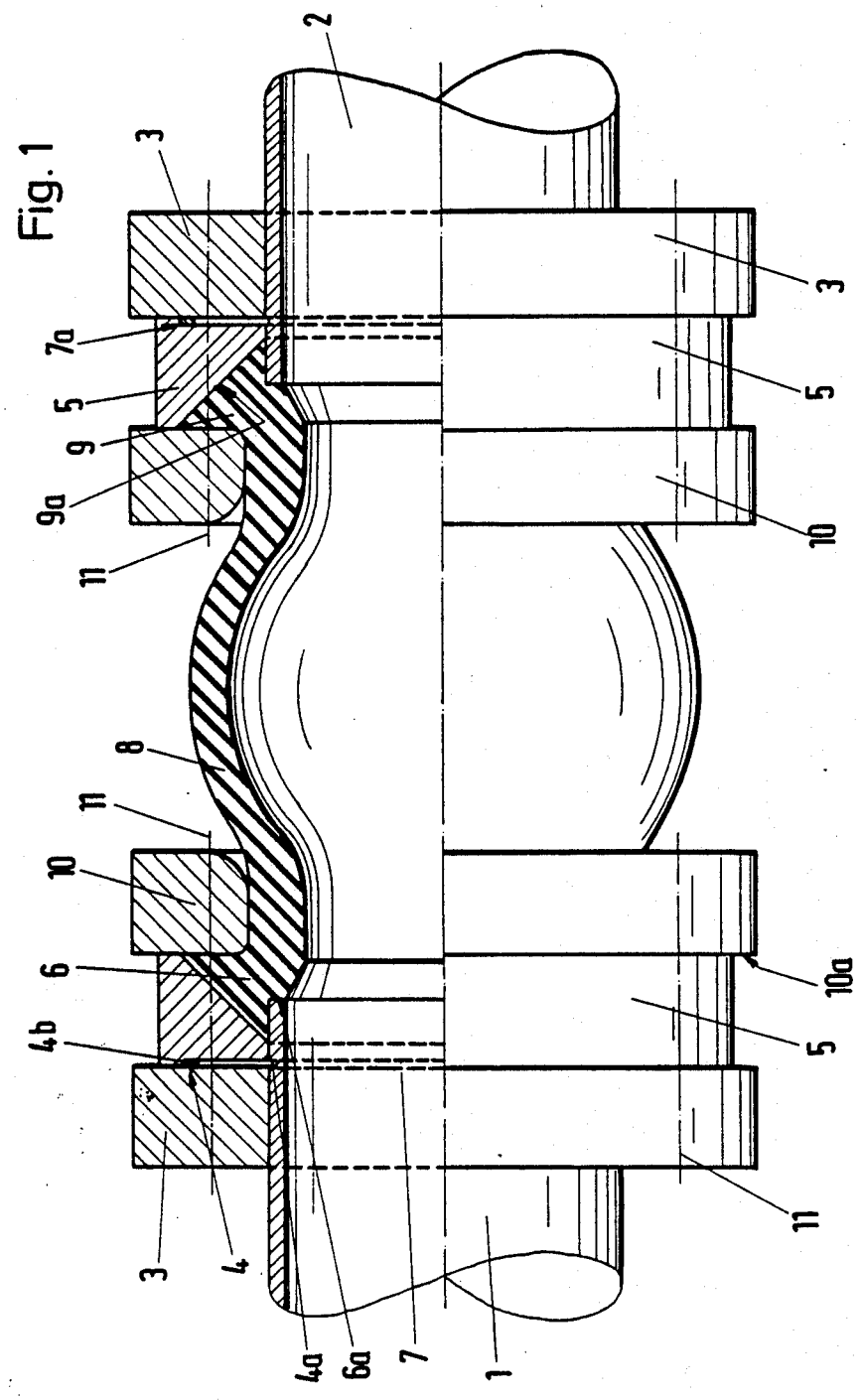
FIG. 1 is a cross-sectional view of one embodiment of the compensator of the invention.

FIG. 1 shows a compensator as an elastic connection between two pipe ends 1 and 2 arranged at a distance from one another. Onto each of the two pipe ends 1 and 2 is pushed first a flange 3, a clamping element 4 and also a chamber part 5. Each chamber part 5 has an annular clamping chamber 7 which is open toward the flange 3 and into which is pushed the clamping element 4 which is made in the shape of an annular disk, is supported on the circumferential surface of the pipe with a radially inwardly located clamping edge 4a and, with respect to its radially outwardly located clamping edge 4b, is overlapped by an annular clamping face 7a of the clamping chamber 7. In the load-relieved condition, each of the clamping elements 4 projects beyond the end face of the respective chamber part 5 in the axial direction. The configuration of the clamping element 4 is at the same time selected in such a way that a force pressing the clamping element in the axial direction against the rear of the clamping chamber 7 leads to an increase in the outside diameter and at the same time to a decrease in the inside diameter of the clamping element. In its annular part, the clamping element 4 can have a curved profile and be provided with radial slots. The flange 3 shown is mde as a flat flange ring.

The chamber part 5 is provided with a sealing chamber 9 which is open in each case toward the intermediate space between the two pipe ends 1 and 2, widens conically in the direction of the said intermediate space and, on its radially inwardly located side, is partly defined by the circumference of the allocated pipe end 1, 2.

The intermediate space between the two pipe ends 1 and 2 is enclosed by a bellows body 8 which is made of rubber and can have a fabric reinforcement. At its two axial ends, the bellows body 8 in each case has a torus 6 which engages into the sealing chamber 9 and grips behind a counter-flange 10 which defines the said sealing chamber 9 in the axial direction. The flange 3 and the counter-flange 10 can be clamped against one another in each case via a bolted connection 11 which in the exemplary embodiment can consist of screw bolts which are inserted only through the flange 3 and the counter-flange 10.

The cross-section of the unloaded torus 6 roughly corresponds to a quarter segment of a circle. When the bolted connection 11 is tightened, the torus 6 is acted upon by the sealing chamber 9 in the radial and axial directions in such a way that the torus fills the sealing chamber and bears under pressure on the conical annular surface 9a of the sealing chamber 9, the end face 10a of the counter-flange 10 and also on the circumference of the respective pipe ends 1 and 2. In addition, the torus 6, with an annular shoulder 6a, bears against the end face of the pipe ends 1 and 2. Moreover, as a result of the bolted connection 11 being tightened, the clamping elements 4 are deformed so that they apply high clamping forces to the pipe ends 1 and 2.

Figure 2:
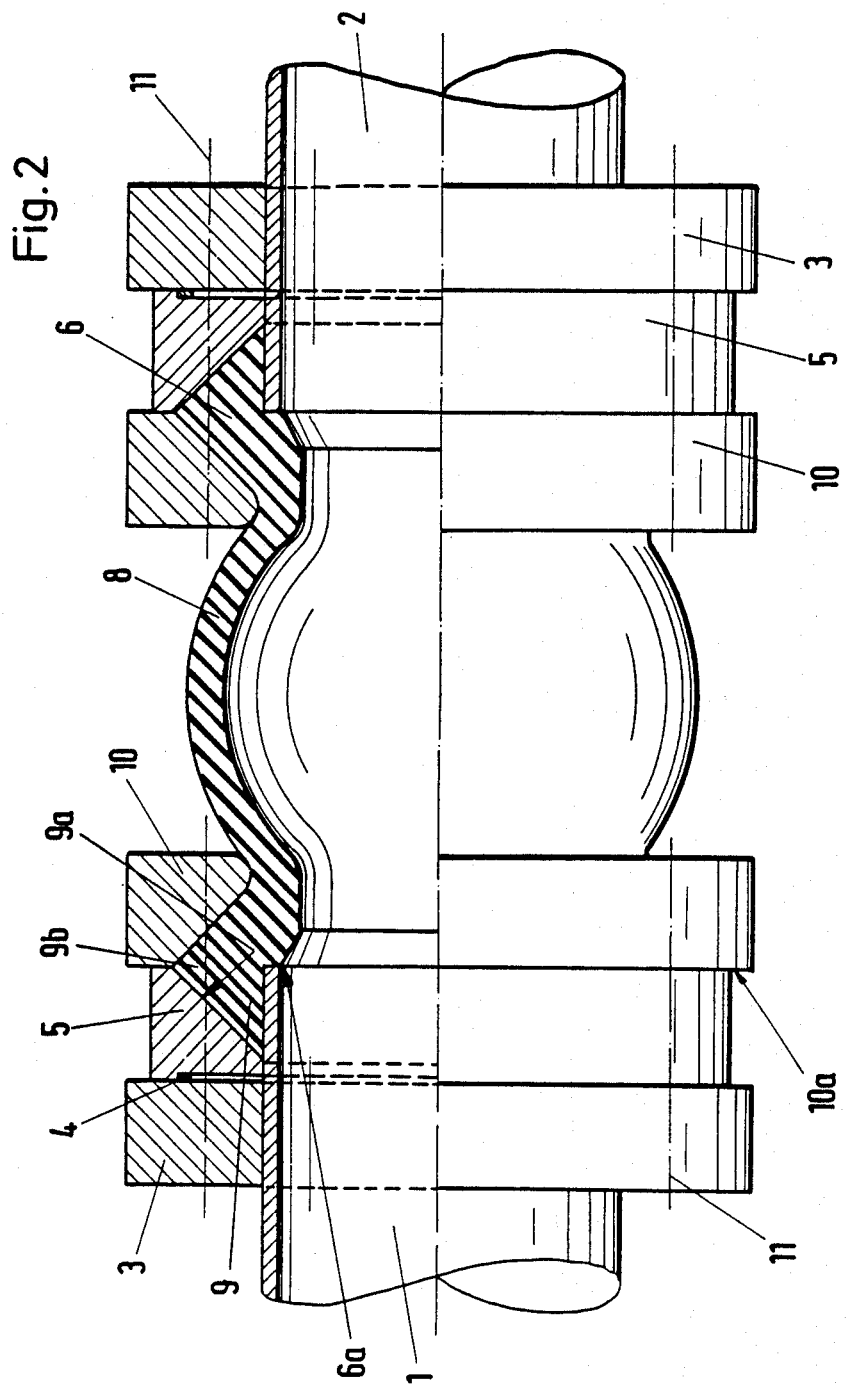
FIG. 2 is a cross-sectional view of a second embodiment of the compensator of the invention.

The embodiment shown in FIG. 2 differs from that of FIG. 1 only by the shape of the torus 6 and of the sealing chamber 9, 9b accommodating the torus 6. Half of the sealing chamber is formed by the sealing chamber 9 in the chamber part 5 and half by a correspondingly made sealing chamber 9b, but arranged for this purpose in mirror image, in the counter-flange 10. In cross-section, the sealing chamber 9, 9b consequently has the approximate shape of an isosceles triangle. In this exemplary embodiment, the cross-section of the unloaded torus 6 approximately corresponds to a semicircular segment.

In the embodiment according to FIGS. 1 and 2, the clear inside diameter of the counter-flange 10 located in each case outside the allocated pipe ends 1 and 2 is greater than the outside diameter of the pipe ends 1 and 2. The counter-flanges 10 can be made of metal or plastic.

Figure 3:
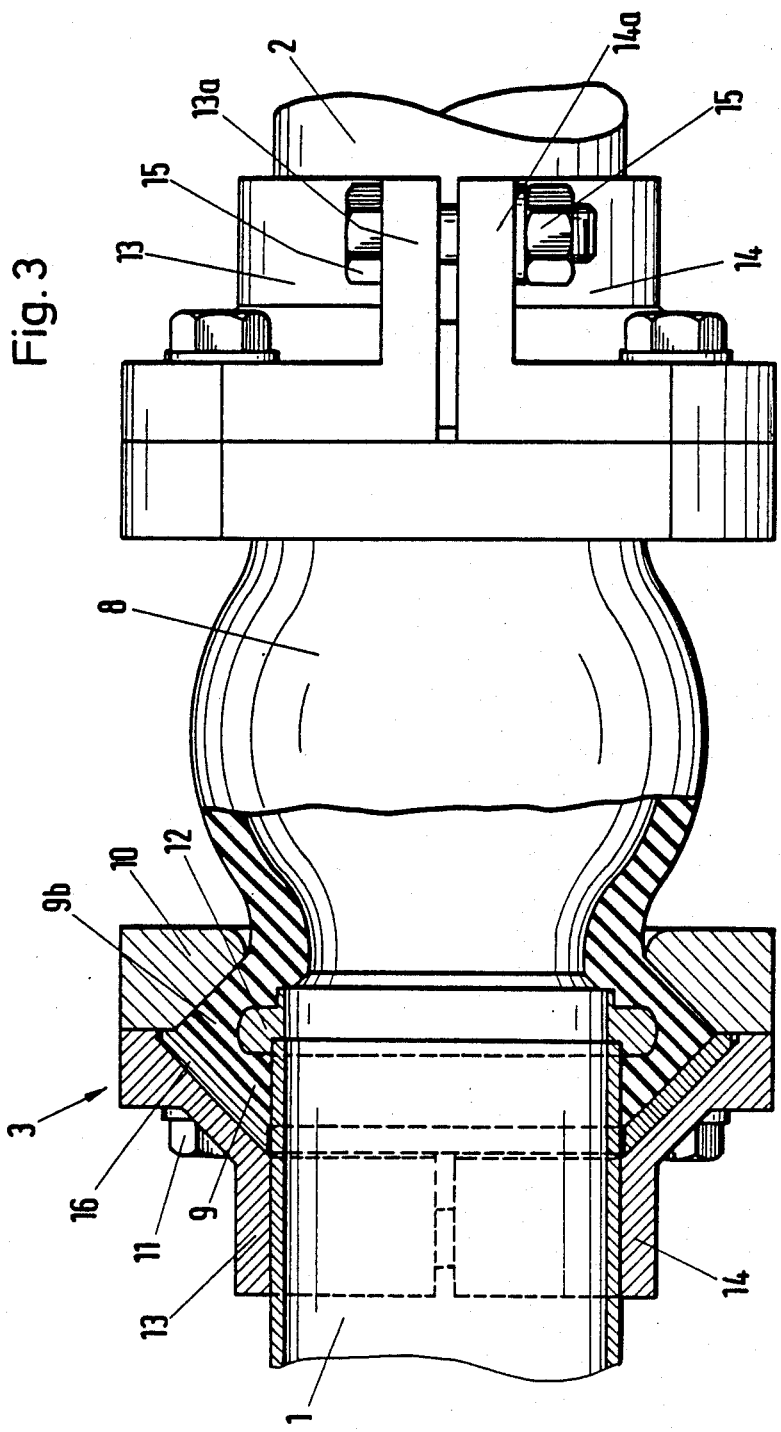
FIG. 3 is a cross-sectional view of a third embodiment of the compensator of the invention.

In the embodiment according to FIG. 3, the configuration of the torus 6 essentially corresponds to that of FIG. 2. However, a stepped supporting ring 12 is provided in the torus 6, which supporting ring 12 bears against the circumference and also the end face of the respective pipe ends 1 and 2 and at the same time consequently serves as a stop for each pipe end. The supporting ring 12 is pressed loosely into a radially inwardly open annular groove in the torus 6, which annular groove is adapted to the outer contour of the supporting ring 12.

In the embodiment according to FIG. 3, neither a separate chamber part nor clamping elements are provided. On the contrary, the sealing chamber 9 is here arranged directly in the flange 3 which is axially split and is made up of two half-shells 13 and 14, each of which has axially running flange edges 13a and 14a which are clamped radially against one another via a bolted connection 15, with the two half-sheels 13 and 14 clamping in between them the respective pipe ends 1 and 2. The half-shells 13 and 14 bear on the end face of each respective counter-flange 10 and are bolted to the latter via screw bolts 11. A conical annular disk 16 is pushed into the sealing chamber 9 defined by the two half-shells 13 and 14, which annular disk 16 is adapted to the conical inner contour of the sealing chamber 9, serves to protect the rubber-elastic torus 6 and is intended to prevent this torus from being clamped in between the flange edges 13a and 14a of the half-shells 13 and 14.

Figure 4:
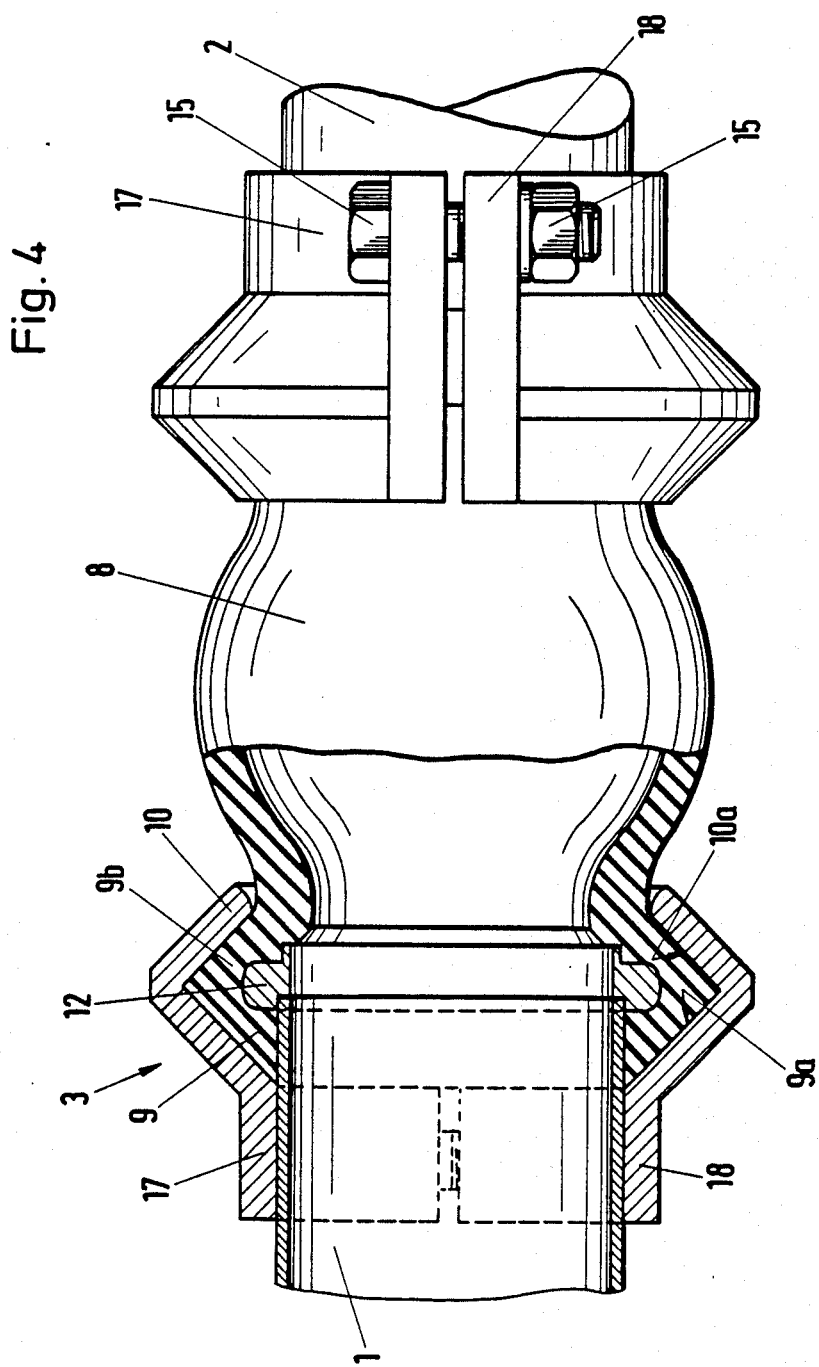
FIG. 4 is a cross-sectional view of a fourth embodiment of the compensator of the invention.

In the embodiment according to FIG. 4, the flange and the counter-flange are jointly formed by two half-shells 17 and 18. Compared with the embodiment according to FIG. 3, the bolted connection 11 is therefore omitted. The installation of a conical annular disk 16 has also been dispensed with.

Figure 5:
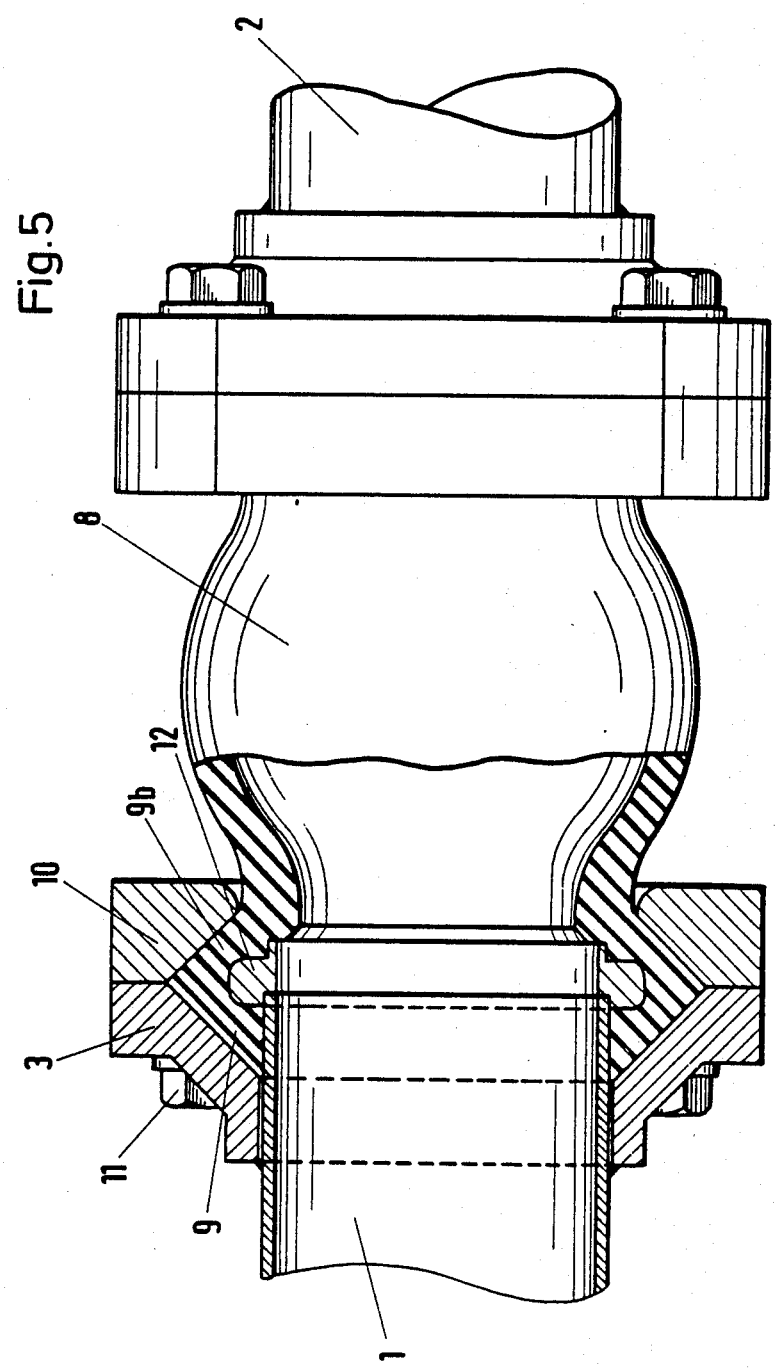
FIG. 5 is a cross-sectional view of a fifth embodiment of the compensator of the invention.

FIG. 5 shows a ccompensator in which the integrally made flange 3 is pushed onto the respective pipe ends 1, 2 and welded to the latter. The counter-flange 10 bears against the flange 3 and is bolted to the latter via screw bolts 11.

Figure 6:
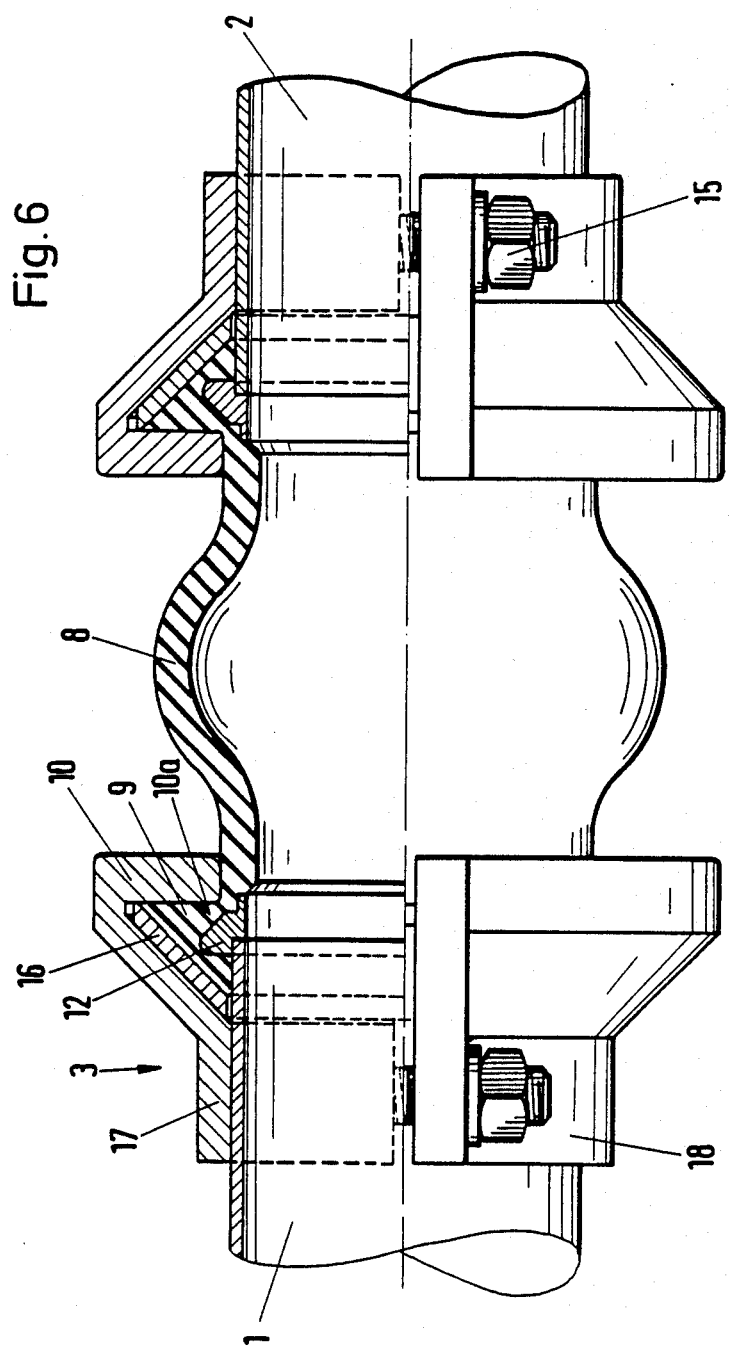
FIG. 6 is a cross-sectional view of a sixth embodiment of the compensator of the invention.

FIG. 6 shows a compensator in which the sealing chamber 9 and the torus 6 approximately correspond to the embodiment according to FIG. 1. Otherwise, however, the flange and the counter-flange area again jointly formed by half-shells 17 and 18 according to FIG. 4. An unsplit, conical annular disk 16 is pushed into the sealing chamber 9.

Rubber compensators which are preferably used in low vacuum ranges and low positive-pressure ranges do not require high clamping forces with respect to their connection to the pipe ends, so that the clamping elements 4 according to FIGS. 1 and 2 can be dispensed with in such ranges of application. In all embodiments, sealing relative to the pipe ends 1 and 2 is effected in two planes running at right angles to one another, namely in the plane formed by the end face of the pipe end 1 or 2 and also in the area of the circumference of each pipe end.

In the embodiments according to FIGS. 1 and 2, the chamber part 5 could consist of several separate segments. It could also be firmly connected to the torus 6 allocated to it.

In the compensators shown, extreme deflections of any reinforcing fabric provided in the bellows body 8 can be avoided. Consequently, additional supporting plaiting can also be dispensed with.

The shell type of construction according to FIGS. 3, 4 and 6 leads to simplification in assembly and dismantling. In all embodiments, the ends of the compensators can be pushed onto the pipe ends 1 and 2 until the latter bear on the annular shoulder 6a of the torus 6 or on the supporting ring 12. A "supple" connecting technique results which is adapted to the rubber material and leads to an increase in compensator life.

What is claimed is:

1. A compensator which forms an elastic connection between the ends of two pipes separated by a gap, comprising:

a bellows body connecting said pipes across the gap;

a flange positioned on each pipe adjacent a respective pipe end, each of said flanges being axially split and comprising two half-shells clamped radially against one another such that said pipe ends are clamped between respective said half-shells of said flanges;

a respective counter-flange positioned over said bellows body adjacent each said pipe end and having an end face facing a respective said flange;

means for forming an annular sealing chamber between said flange and said counter-flange on each said pipe, each said sealing chamber having a first conical annular surface in said flange opening in the direction of said end face of said counter-flange;

a torus formed at each respective end of said bellows body adjacent said ends of said pipes, a respective torus being received in each said sealing chamber and fitted over an outer circumference of the respective pipe; and means for applying a compression load to said tori, such that each said torus fills a respective said annular sealing chamber and bears against said conical annular surface, said end face of said counter-flange and said outer circumference of a respective said pipe, thereby fluidly sealing said compensator against said pipes and providing sealed fluid communication between said pipes.

2. A compensator as claimed in claim 1, wherein said compensator includes a stepped supporting ring provided in each said torus, each said supporting ring bearing against an end face of a respective pipe end.

3. A compensator as claimed in claim 2, wherein each said torus includes a radially inward open annular groove, and wherein each said supporting ring is pressed loosely into the groove of a respective said torus, each said annular groove being adapted to the outer contour of a respective said supporting ring.

4. A compensator as claimed in claim 1, wherein said half-shells bear on said end faces of respective said counter-flanges and are bolted to said end faces.

5. A compensator as claimed in claim 4, wherein said compensator includes a conical annular disk positioned against said respective first conical annular surfaces in said flanges.

* * * * *